2,799,472
Patented July 16, 1957

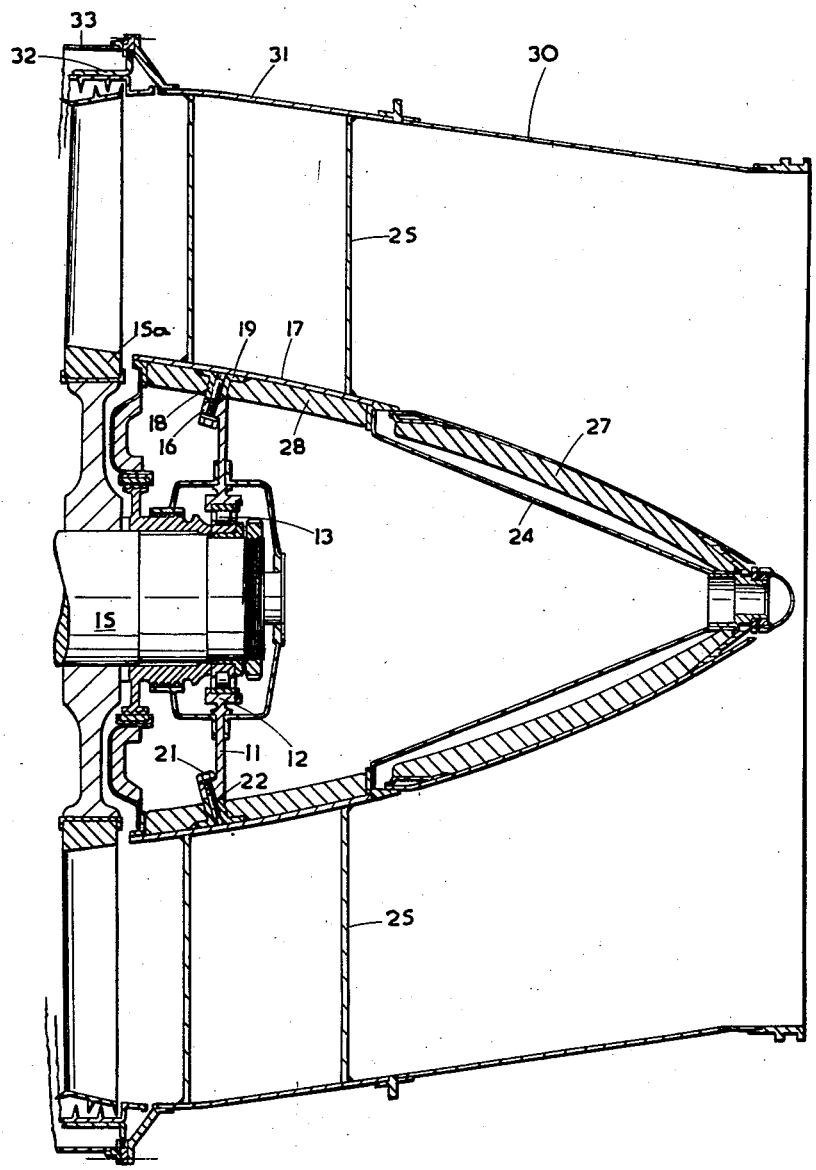

2,799,472
EXHAUST CONE ASSEMBLIES OF GAS TURBINE ENGINES

Horace S. Rainbow, Coventry, England, assignor to Armstrong Siddeley Motors Limited, Coventry, England Application June 29, 1954, Serial No. 440,194

Claims priority, application Great Britain July 3, 1953

3 Claims. (Cl. 253—39)

This invention relates to the exhaust cone assembly of a gas turbine engine, this comprising an outer casing connected by aerofoil spokes with an inner casing which carries the conical extension forming the inner wall of the diffuser passage.

The main object of the invention is to provide an improved means of supporting a shaft bearing at the rear end of the turbine. This is particularly desirable in the case of the low-pressure section of a compound gas turbine engine; but there may be other cases of a multi-stage turbine where it is desirable that a shaft bearing should be provided at the rear of the turbine.

According to the invention, such a bearing, preferably a non-thrust or journal bearing, is supported by a diaphragm which in cold conditions is an interference fit in the inner casing within the region where this is connected to the outer casing by the aerofoil spokes; and angularly-spaced pin means are provided to communicate between the outer edge of the diaphragm and the inner casing so as to afford location between the diaphragm and the inner casing in all directions except in a generally radial direction—i. e., so that the diaphragm will not restrain the radial expansion of the inner casing, but will maintain its concentricity and alignment relatively to the inner casing.

The single figure of the accompanying drawings is a fragmentary sectional elevation of an exhaust cone assembly, carrying a shaft bearing at the rear end of the turbine, arranged according to the invention.

In the construction shown, the diaphragm 11 is in the form of an annular plate adapted at its inner periphery to provide a housing 12 for the outer race ring of a roller or other journal bearing 13 for a shaft 15 carrying a turbine rotor assembly 15a. The diaphragm has a rim 16 at its outer periphery offset from the central plane of the diaphragm, and the inner casing 17 is provided with a co-acting internal ring 18 (shown as having an external flange 19 secured to the internal face of the casing 17) which makes the aforesaid interference fit with the rim of the diaphragm in non-working conditions. At intervals through the diaphragm rim 16 are secured screws 21 extending outwardly in a generally radial direction and having plain pin portions 22 which are slidingly received in holes provided for the purpose in the co-acting ring 18.

It will be appreciated that after the ring of the inner casing has been shrunk on to the rim of the diaphragm, these two members form a unitary structure, and, as such, they can be machined together to finished form. In order to facilitate the machining of the co-axial screwed and plain holes in the rim and ring respectively, and the subsequent fitting of the pin members 21, 22, it is preferable that the axes of the said holes, whilst being truly radial in an end view of the diaphragm, should not be truly radial in their respective axial sectional views but should be appropriately inclined to the plane of the diaphragm at a small angle, as shown. As previously stated, the diaphragm must not restrain the radial expansion of the inner casing 17, but it must retain its concentricity and alignment relatively to the inner casing.

By the use of holes inclined, in the respective axial sectional elevations, at a small angle to the plane of the diaphragm, it is possible for the rim 16 and ring 18 to be of lighter construction than if the pin members were exactly at right angles to the diaphragm axis.

The conical extension 24 of the exhaust cone assembly may be a separate member connected to the adjacent end of the inner casing 17 downstream of the spokes 25, the interior chamber formed by the inner casing and the conical extension being ventilated to atmosphere by means not shown.

Furthermore, this chamber should be insulated from the exhaust gases by an appropriate blanket or lagging. The latter is conveniently made in two portions, namely, an external portion 27 round the conical extension 24, and a separate portion 28 which is disposed internally of the inner casing where the diaphragm is mounted.

The outer casing is shown as comprising two portions, namely, a downstream portion 30 connected to a portion 31 from which the spokes 25 are supported and which is itself supported from the downstream end of the support 33 for the turbine stator casing 32.

What I claim as my invention and desire to secure by Letters Patent of the United States is:

1. For a gas turbine engine having a turbine shaft, an exhaust cone assembly comprising outer and inner casings connected together by aerofoil spokes, said assembly providing a diffuser passage for the exhaust gases of the engine, said inner casing carrying a conical extension which forms the inner wall of said diffuser passage, a diaphragm having in cold conditions an interference fit in said inner casing within the region where the latter is connected to said outer casing by the aerofoil spokes, said diaphragm supporting a bearing for the turbine shaft, and angularly spaced relatively small pin means communicating between an outer edge of the diaphragm and said inner casing so as to afford location between the diaphragm and said inner casing in all directions except in a generally radial direction, and in which said diaphragm has a rim at its outer periphery, and the internal face of said inner casing has a ring secured to it, said interference fit being between said rim and said ring, the diaphragm providing the primary support of the bearing from the inner casing and the relatively small pins merely providing axial and circumferential location of the diaphragm.

2. The combination of claim 1, in which said pin means take the form of screws carried by said rim and having plain pin portions slidingly received in holes provided in said ring.

3. The combination of claim 2, in which said rim is offset from the central plane of the diaphragm, said pin means being truly radial in an end view of the diaphragm but not truly radial in their respective axial sectional views.

References Cited in the file of this patent

UNITED STATES PATENTS

| | | |
|---|---|---|
| 2,439,447 | Buck | Apr. 13, 1948 |
| 2,575,889 | Oulianoff | Nov. 20, 1951 |
| 2,587,057 | McVeigh | Feb. 26, 1952 |
| 2,616,662 | Mierley | Nov. 4, 1952 |
| 2,622,843 | Williams | Dec. 23, 1952 |